United States Patent
Alvarez et al.

(10) Patent No.: US 9,718,606 B2
(45) Date of Patent: Aug. 1, 2017

(54) METHOD FOR DELIVERING A COFFEE BEVERAGE BY CENTRIFUGATION IN A BEVERAGE PRODUCING DEVICE

(75) Inventors: Diego Jimenez Alvarez, Lausanne (CH); Delphine Ricoux, Sugiez (CH); Pierre Monnier, Arnex-sur-Orbe (CH); Christian Jarisch, Lutry (CH); Alfred Yoakim, St-Legier-la Chiesaz (CH); Alexandre Perentes, Lausanne (CH)

(73) Assignee: Nestec S.A., Vevey (CH)

( * ) Notice: Subject to any disclaimer, the term of this patent is extended or adjusted under 35 U.S.C. 154(b) by 269 days.

(21) Appl. No.: 13/577,228

(22) PCT Filed: Feb. 2, 2011

(86) PCT No.: PCT/EP2011/051481
§ 371 (c)(1),
(2), (4) Date: Aug. 3, 2012

(87) PCT Pub. No.: WO2011/095518
PCT Pub. Date: Aug. 11, 2011

(65) Prior Publication Data
US 2012/0308691 A1  Dec. 6, 2012

(30) Foreign Application Priority Data

Feb. 8, 2010 (EP) .................... 10152913
Feb. 12, 2010 (EP) .................... 10153522

(Continued)

(51) Int. Cl.
B65D 85/804 (2006.01)
A47J 31/06 (2006.01)
A47J 31/22 (2006.01)

(52) U.S. Cl.
CPC ...... *B65D 85/8043* (2013.01); *A47J 31/0642* (2013.01); *A47J 31/22* (2013.01)

(58) Field of Classification Search
CPC .......... A47J 31/002; A47J 31/02; A47J 31/22; A23F 5/24; B65D 85/8043
(Continued)

(56) References Cited

U.S. PATENT DOCUMENTS 2,340,758 A * 2/1944 Kappenberg et al. ........ 426/432
5,104,666 A * 4/1992 Sanvitale ...................... 426/77
(Continued)

FOREIGN PATENT DOCUMENTS

DE  1 142 433 B   1/1963
DE  80 20 895 U1  12/1981
(Continued)

OTHER PUBLICATIONS

International Search Report and Written Opinion, PCT/EP2011/051481, mailed Aug. 10, 2011.

*Primary Examiner* — Erik Kashnikow
*Assistant Examiner* — Chaim Smith
(74) *Attorney, Agent, or Firm* — K&L Gates LLP

(57) ABSTRACT

A method for preparing a short coffee extract from a capsule containing coffee powder. The method includes providing a capsule containing contains between 5.0 and 8.5 gram of ground coffee powder, injecting liquid into the capsule to interact with the coffee powder, and centrifuging the capsule in a beverage producing device to force, by the effect of centrifugal forces, the liquid coffee extract out of the capsule so that it can be collected and dispensed. The extraction of the liquid coffee extract is preferably obtained by rotating the capsule within a speed range of 2500 to 7500 rpm.

7 Claims, 5 Drawing Sheets

(30) Foreign Application Priority Data

| Feb. 12, 2010 | (EP) | .................................... 10153528 |
| Feb. 12, 2010 | (EP) | .................................... 10153531 |
| May 12, 2010 | (EP) | .................................... 10162630 |
| May 12, 2010 | (EP) | .................................... 10162637 |
| May 12, 2010 | (EP) | .................................... 10162674 |

(58) Field of Classification Search
USPC .................................... 426/432–433; 99/295
See application file for complete search history.

(56) References Cited

U.S. PATENT DOCUMENTS

| 5,402,707 | A | | 4/1995 | Fond et al. ...................... 99/295 |
| 5,897,899 | A | * | 4/1999 | Fond ............................ 426/112 |
| 7,607,385 | B2 | | 10/2009 | Halliday et al. |
| 8,475,860 | B2 | * | 7/2013 | Colantonio et al. .......... 426/433 |
| 2005/0158426 | A1 | | 7/2005 | Hu et al. .......................... 426/77 |
| 2005/0183581 | A1 | | 8/2005 | Kirschner et al. ............... 99/295 |
| 2008/0216666 | A1 | | 9/2008 | Doglioni Majer |
| 2009/0324791 | A1 | * | 12/2009 | Ohresser ............. A47J 31/0673 426/433 |
| 2010/0203198 | A1 | | 8/2010 | Yoakim et al. ................. 426/80 |
| 2010/0239734 | A1 | | 9/2010 | Yoakim et al. ............... 426/433 |
| 2011/0003046 | A1 | | 1/2011 | Yoakim et al. ............... 426/431 |
| 2011/0189362 | A1 | * | 8/2011 | Denisart et al. .............. 426/433 |

FOREIGN PATENT DOCUMENTS

| EP | 0 512 470 A1 | 11/1992 | | |
| EP | 2000062 A1 | 12/2008 | | |
| FR | 2 712 163 | 5/1995 | | |
| JP | 2737365 | 2/1992 | | |
| WO | WO 2006/112691 A1 | 10/2006 | | |
| WO | 2008148601 | 12/2008 | | |
| WO | WO 2008/148604 A1 | 12/2008 | | |
| WO | WO 2008/148650 A1 | 12/2008 | | |
| WO | WO 2008/148834 A1 | 12/2008 | | |
| WO | WO 2009/106175 A1 | 9/2009 | | |
| WO | WO 2009/106598 A1 | 9/2009 | | |
| WO | 2010026053 | 3/2010 | | |
| WO | WO 2010026053 A1 * | 3/2010 | ............. | A47J 31/22 |
| WO | WO2011095518 | 8/2011 | | |

* cited by examiner

US 9,718,606 B2

METHOD FOR DELIVERING A COFFEE BEVERAGE BY CENTRIFUGATION IN A BEVERAGE PRODUCING DEVICE

This application is a 371 filing of International Patent Application PCT/EP2011/051481 filed Feb. 2, 2011.

BACKGROUND

The present invention relates to a method for delivering a coffee beverage by centrifugation.

A traditional extraction method for preparing short coffee beverages such as ristretto or espresso consists in applying a water piston at high pressure from one side of an enclosure containing ground coffee powder and extracting a coffee extract at the opposite side of the enclosure. This method promotes the delivery of coffee beverages experiencing high aroma and flavour intensity which are particularly appreciated by coffee gourmets.

Other methods consist in brewing a long coffee under low pressure or gravity such as by the use of a drip coffee maker. The low pressure involved during extraction provides coffee with a lower aroma intensity. Therefore, unless a large excess of coffee powder is placed in the coffee maker, often the coffee is watery, has a low aroma/flavour profile and has usually no sufficient foam.

Due to the low pressure, the drip coffee method is not adapted for delivering short coffee beverages as it does not provide enough body, flavour, aroma intensity and crema.

The preparation of coffee by using the centrifugation is also already known. The principle mainly consists in providing ground coffee in a receptacle, feeding liquid in the receptacle and rotating the receptacle at elevated speed to ensure interaction of liquid with powder while creating a gradient of pressure of liquid in the receptacle; such pressure increasing gradually from the centre towards the periphery of the receptacle. As liquid traverses the coffee bed, extraction of the coffee compounds takes place and a liquid extract is obtained that flows out at the periphery of the receptacle.

Another problem encountered with the known coffee centrifugation processes relates to the non-homogeneous interaction between liquid and coffee that negatively affects the quality of coffee extraction. In particular, it may be that liquid does not wet uniformly coffee or water may find preferred flow path in the coffee powder or water pockets form in the coffee receptacle, etc. As a consequence, the transfer of coffee solids into liquid is not optimal. Also, coffee flavour and aroma intensity can be lost. This problem is particularly sensible when a short coffee beverage such as ristretto or espresso-type coffee is produced by centrifugation because the loss on coffee quality (strength, aroma/flavour, crema, etc.) is usually more perceivable than for longer coffee (lungo or longer coffee).

WO2008/148834 relates to a capsule for use in a beverage preparation device using centrifugation forces to extract the beverage extract wherein, as an example, the capsule may contain 6.5 of coffee powder of particle size of 260 microns. The capsule is rotated at about 8000 rpm at a liquid flow rate of about 2 gram/second.

There is a need for delivering a short coffee having an improved quality, in particular, its aroma and flavour intensity so that it matches the quality of the coffee obtained by the traditional extraction method. The present invention provides a solution to this need.

There is also need for delivering a selection of coffee beverages by a common method while achieving improved coffee quality results. In particular, there is a need for improving the extraction quality of coffee beverages of different volumes such as short, medium and/or long coffees while reducing the disadvantages of the known methods.

There is also a need for improving the "crema" on the top of the coffee beverage. These needs are now met by the present invention.

SUMMARY OF THE INVENTION

In a first aspect, the invention relates to a method for preparing a short coffee from a capsule containing coffee powder,
  providing a capsule containing between 5.0 and 8.5 gram of ground coffee powder,
  injecting a liquid in the capsule; said liquid interacting with the coffee powder and centrifuging the capsule in a beverage producing device to force, by effect of the centrifugal forces, the liquid coffee extract out of the capsule; such coffee extract being then collected,
  wherein the extraction of the liquid coffee extract is obtained by rotating the capsule within a speed range comprised within a range of 2500 to 7500 rpm.

Preferably, the extraction of the liquid coffee extract is obtained by rotating the capsule within a speed range comprised within a range of 2500 to 5000 rpm. Most preferably the speed range is comprised within a range of 3500 and 4500 rpm.

In a second aspect, the invention relates to a capsule designed for the preparation of a, preferably short, coffee extract by centrifugation in a beverage preparation device comprising a body, a rim and an upper wall member;
  the capsule containing between 4 and 15 grams, preferably 5 and 8.5 grams of coffee powder; most preferably 7 and 8 grams of coffee powder,
  the coffee powder having a particle size ($D_{4,3}$) comprised within a range of 160 and 400 microns; more preferably 160 and 255 microns;
  the capsule having a storage volume available for receiving the coffee powder and gas comprised between 18 and 28 ml; preferably about 24 ml (+/−1 ml);
  the rim having an annular valve portion (8) having a thickness comprised between 1.0 and 3.5 mm; preferably 1.2 and 2.8 mm.

In a third aspect, the invention relates to a method for delivering a liquid coffee extract of a selected volume from a capsule containing coffee powder in a beverage producing device by injection of a liquid interacting with the coffee powder and centrifugation of the capsule in the beverage producing device to force, by effect of the centrifugal forces, the coffee liquid extract out of the capsule; such liquid coffee extract being then collected,
  wherein the method comprises:
  selecting a capsule from a set of capsules containing different amounts of ground coffee; each amount corresponding to a given range of volumes of liquid coffee extract to be delivered,
  rotating the capsule in the device to obtain the extraction of the liquid coffee extract,
  controlling the volume of liquid extract to be delivered from the capsule,
  wherein the rotation during extraction is controlled within a rotational speed range comprised within a range of 500 and 7500 rpm and,
  wherein the liquid flow rate differs as a function of the volume of liquid coffee extract and/or as a function of the size of the capsule in the set and/or as the function of the amount of coffee powder contained in the capsule.

In a fourth aspect, the invention relates to a method for delivering a liquid coffee extract from a capsule containing coffee powder in a beverage producing device by injection of a liquid interacting with the coffee powder and centrifugation of the capsule in the beverage producing device to force, by effect of the centrifugal forces, the coffee liquid extract out of the capsule; such liquid coffee extract being then collected, wherein the method comprises:
selecting a capsule from a set of several capsules; each one containing different amounts of ground coffee; each amount corresponding to a given range of volumes of liquid coffee extract to be delivered,
rotating the capsule in the device to obtain the extraction of the liquid coffee extract,
controlling the volume of liquid extract to be delivered from the capsule,
wherein the liquid flow rate decreases as the delivered volume of the liquid coffee extract is smaller and/or the size of the capsule is smaller in the set and/or the amount of coffee powder in the capsule is smaller in the set.

In a fifth aspect, the invention relates to a method for delivering a liquid coffee extract with crema from a capsule containing coffee powder,
by injecting in the capsule a liquid interacting with the coffee powder and centrifuging the capsule in a beverage producing device to force, by effect of the centrifugal forces, a liquid coffee extract flying out of the capsule from a flow restriction against an impact wall; such liquid coffee extract being then collected by and delivered from the device,
and wherein the flying distance is comprised within a range of 0.3 to 10 mm.

In a sixth aspect, the invention relates to a method for delivering a liquid coffee extract with crema from a capsule containing ground coffee powder,
by injection in the capsule of a liquid interacting with the coffee powder and centrifugation of the capsule in a beverage producing device to force, by effect of the centrifugal forces, a liquid coffee extract flying out of the capsule against an impact wall; such liquid coffee extract being then collected by and delivered from the device,
wherein the extraction of the liquid coffee extract is obtained by rotating the capsule within a rotational speed range,
and wherein the flying distance is varied depending on the volume of the liquid coffee extract to be delivered and/or depending on the size of the capsule and/or depending on the amount of coffee powder contained in the capsule.

In a seventh independent aspect the invention relates to a process for producing a coffee beverage by centrifugation in a beverage producing device wherein the device is configured to carry out the following operations:
feeding liquid in a receptacle containing dry coffee powder positioned in the device,
rotating the receptacle at a rotational speed or within a rotational speed range to obtain the extraction of the liquid coffee extract at the periphery of the receptacle by driving the receptacle in rotation and,
collecting the liquid coffee extract,
wherein before feeding liquid in the receptacle, a dry coffee compaction step consists in centrifuging coffee powder in the receptacle in dry state ("dry coffee compaction step").

In particular, the receptacle is rotated in such a manner to force dry coffee powder to compact on the peripheral wall of the receptacle and to leave a passage for liquid to be fed in the central region of the receptacle.

In particular, it has been found that submitting the dry coffee powder to centrifugal force at the beginning of the preparation process enables to improve the subsequent extraction of coffee liquid. In particular, this preliminary centrifugal operation on dry powder ensures that coffee powder is compacted in the receptacle before liquid is supplied in the receptacle.

The degree of compaction of the dry coffee powder in the receptacle can be controlled by controlling the speed of rotation and the duration of rotation during this step. More preferably, dry coffee is centrifuged in the receptacle at a speed of at least 500 rpm, for at least 1 second, preferably at least 2 seconds. Preferably, dry coffee is centrifuged in the receptacle at a speed of at least 2000 rpm for at least 2 seconds, preferably for at least 3 seconds. Most preferably, the rotational speed of dry coffee powder is carried out at a speed of between 4500 and 10000 rpm, and a duration of between 4 and 10 seconds, most preferably at a speed of about 8000 rpm and for about 6 seconds.

In order to decrease the dry coffee compaction step, the rotational speed is accelerated. The acceleration of the rotational speed during this step is preferably of at least 500 rpm/second, most preferably of at least 1000 rpm/second, most preferably comprised between 1000 and 5000 rpm/second.

Other product parameters can be set to promote a homogenous compaction such as the coffee grind size. In general, coffee average grind size ($D_{4,3}$) is preferably comprised between 100 and 1000 microns more preferably between 160 and 700 microns.

The receptacle is driven in rotation along its central axis by a rotational driving assembly such as described, for example, in WO 2009/106598 or co-pending European application No. 09178382.9 entitled: "Capsule system with flow adjustment means". In particular, the rotational driving assembly comprises a motor, such as a DC electrical rotary motor, and coupling means designed for engaging the receptacle and driving it in rotational motion along the central axis of the receptacle. The rotational speed is typically controlled by measuring the rotational speed of the motor, e.g., by an optical or Hall effect sensor, the speed-related signal measured by the sensor being received and treated by a control unit of the beverage producing device.

Control of the liquid fed in the receptacle is carried out by a control unit of the device which switches the pump on and off to match the different steps of the beverage preparation process. The pump may be any suitable water supply pump such as a solenoid pump, a diaphragm pump, a peristaltic pump and so on. The pump is preferably supplied with liquid from a liquid supply reservoir that is part of the device, such as a water tank. The volume of liquid fed to the receptacle during preparation can be measured by a flow meter that sends the measured values to the control unit. The flow meter can be positioned in the fluid circuit at any suitable position such as downstream of the liquid or close to or inside the liquid supply reservoir.

The rotational speed of the receptacle can also be controlled by the control unit to match a liquid flow rate of reference of the liquid fed in the receptacle. For this, the liquid flow rate of liquid is monitored by the control unit and compared to a liquid flow rate of reference. In response, the control unit adjusts the rotational speed and the pump to maintain the liquid flow rate as close to the flow rate of reference. Such principle is also described in detail in WO 2009/106598.

In the preferred process of preparation, after the step of dry coffee centrifugation, a step consists in feeding liquid in the receptacle to prewet ground coffee ("prewetting step"). During this step and before extraction of the coffee liquid, the rotational speed is preferably stopped or reduced compared to the previous step, i.e., dry coffee centrifugation step. The prewetting step enables to fill the receptacle with liquid and ensures a diffusion of liquid in coffee powder in particular from the central part of the receptacle. The receptacle is preferably not rotated at all or rotated at a low speed only, preferably lower than 250 rpm, more preferably lower than 100 rpm. High centrifugal force must be avoided as it would create a non-homogenous distribution of liquid in the coffee powder. Preferably, the prewetting step is carried out at a liquid flow rate of about 1 to 10 ml/sec., preferably about 4-6 ml/sec.

In the preferred process of the invention, the quantity of liquid fed in the receptacle during the prewetting step is increased as the quantity of coffee powder in the receptacle becomes larger. The receptacle may indeed by charged with different quantities of coffee powder, such as 5, 6, 7 or 10 grams, etc., depending on the type or volume of coffee beverage to be produced. In consequence, the process consists in controlling the device such that the liquid fed in the receptacle for prewetting increases proportionally to the quantity of powder. As a result, coffee is always well properly wetted for all the different coffee volumes possibly proposed (e.g., ristretto, espresso, lungo, etc.).

During the prewetting step, the quantity of liquid fed in the receptacle is between one and 2 times, preferably between 1.35 to 1.75 times, the quantity of coffee in the receptacle. Most preferably, the quantity of liquid fed in the receptacle is 1.5 times the coffee quantity.

After prewetting of coffee powder, the receptacle is then rotated again at high speed to impart sufficient centrifugal force to the liquid and thereby start the extraction of the coffee liquid from the capsule. Normally, the rotational speed is increased to a sufficient value for extraction when the receptacle has been filled with the predetermined quantity. In the preferred process of the invention, during the extraction step, liquid continues to be fed in the receptacle until the fed liquid volume has reached a preset volume corresponding to the desired coffee beverage volume.

During the extraction step, the rotational speed is preferably comprised between 2500 and 7000 rpm, preferably between 3000 and 4500 rpm. The speed may be varied depending on the quantity of coffee powder contained in the receptacle such as the lower the quantity, the lower the flow rate. The speed is also controlled depending on the back-pressure that opposes to the flow of the coffee liquid extract. A back-pressure can be set by a narrow restriction, e.g., a restriction valve, that is placed at the periphery of the receptacle such as described in WO 2009/106598 or co-pending European patent application No. 09178382.9. The speed during extraction must be sufficient enough to ensure that the coffee liquid flows through the restriction, e.g., opens and traverses through the valve. A delay on the release of coffee liquid extract from the receptacle can also be set by the restriction valve until the speed reaches a threshold that opens the restriction valve. In a particular mode, the restriction valve is formed by a portion of rim of the capsule and a pressing portion of the device resiliably engaging in closure the portion of rim of the capsule against the force of a resilient member (e.g., springs).

During the extraction step, the rotation of the receptacle is continued after the liquid feeding in the receptacle is stopped to ensure a partial or total emptying of liquid from the receptacle. In practice, the control unit is programmed to stop liquid from being pumped by the liquid pump but it maintains the rotation of the motor at a high enough speed to carry on extraction of coffee liquid through the receptacle. It should be noted that the coffee concentration in the liquid extract decreases over the extraction time due to the exhaustion of the coffee solubles from the coffee bed. In a preferred mode, the rotational speed during emptying of the capsule is comprised between 2500 and 8000 rpm, preferably between 3000 and 7000 rpm.

The receptacle used in the process of the invention may be a single-use capsule such as, for example, described in WO2008/148604, WO 2008/148650 or co-pending European patent applications No. 09178382.9 or No. 10152158.1.

The capsule typically comprises a cup-shaped body and a lid that closes the body. In some mode of the referenced prior patent applications belonging to the applicant, the lid may be a perforable membrane that sealingly closes the body. The membrane is then perforated when inserted in the device for providing a liquid inlet and/or coffee liquid outlets. In other modes, the capsule has a lid that provides coffee outlets by effect of the centrifugal force exerted by the coffee liquid at the periphery of the capsule, e.g., such as on a flexible lip. In other modes, the capsule can comprise a liquid porous upper wall as the lid.

The receptacle can alternatively be a cell of the device filled with ground coffee from coffee supply in bulk, e.g., a coffee reservoir placed in the device. The cell can also be removably insertable in the device to facilitate loading with coffee powder such as, for example, described in FR2712163. In another mode, the cell can be supplied in coffee powder by a chute such as in WO2006/112691.

The invention further relates to a device for producing a coffee beverage wherein it comprises:
 a rotational driving assembly including a motor and coupling means for engaging with the receptacle and driving it in rotation,
 a liquid feeding means including a liquid pump and a liquid injector configured for supplying liquid in the receptacle substantially along its rotational axis,
 a heater for heating the supplied liquid,
 a control unit for controlling at least the motor and the liquid pump for carrying out the process as aforedescribed.

Specific modes of the invention will now be explained with reference to the drawings as matter of examples.

The objects of the present invention are achieved by means of the appended claims.

The terms "coffee powder" or "dry coffee" are essentially used here to mean ground coffee or roasted and ground coffee powder.

The term "liquid" is essentially used here alone to mean the diluent used for extracting coffee, generally, water, more preferably hot water.

The term "coffee liquid" or "coffee" (used alone) or "liquid extract" are essentially used here to mean the coffee extract in liquid form that is obtained or obtainable from the receptacle itself or from the device after its collection.

The terms "quantity" or "amount" refer essentially to a measure of weight.

The term "size of capsule" or "volume" is used to mean the volume available in the capsule for storing coffee powder.

The terms "short coffee" is used to mean a liquid coffee extract of between 10 ml and 60 ml, more particularly, 25 (+/−3) ml for ristretto and 40 (+/−3) ml for espresso.

The terms "medium-size coffee" is used to mean a liquid coffee extract of between 60 and 120 ml, more particularly, 120 (+/−10) ml for a lungo coffee.

The terms "long-size coffee" is used to mean a liquid coffee extract of between 120 and 500 ml (more particularly 230 (+/−10) ml) for a large coffee.

In the text, the terms "within a range of x and y" or "between x and y" cover the limit values x and y of the range.

The term "liquid flow rate" means the value of the flow rate (expressed in ml/s) of the liquid as measured by a flow meter positioned in the liquid supply circuit of the beverage producing device.

The "flying distance" is meant to be the shortest distance which separates the outermost point (or line) of any rotational surface contacting the liquid coffee extract and the point (or line) of the impact face of the device which is perpendicular to the rotational axis of the capsule in the device.

The terms "threshold of pressure" or "back-pressure" in the context of the restriction valve of the invention refer to the pressure exerted by the spring-biasing means of the device on the engaged rim of the capsule expressed in $kg.force/cm^2$.

The "coffee extraction" refers to the period of extraction during which both liquid is fed in the capsule and a liquid coffee extract is delivered from the beverage producing device.

In the present text, the values are given with a maximum tolerance of 5% unless mentioned otherwise.

DETAILED DESCRIPTION OF THE INVENTION

Figure 1A:
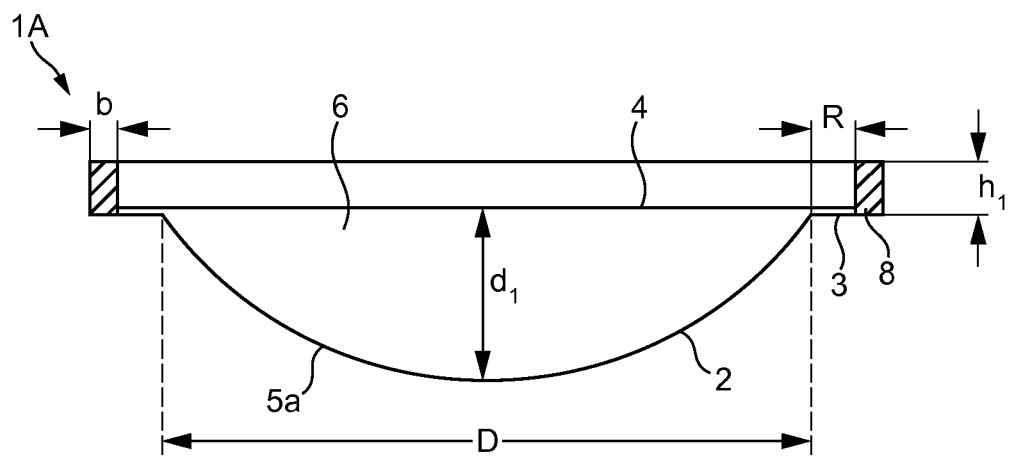
FIG. 1a-1c are cross sectional side views of different embodiments of receptacles of the invention for preparing coffee beverages, in particular, single-use capsules having different sizes and a variation of height of their rim.
Figure 1B:
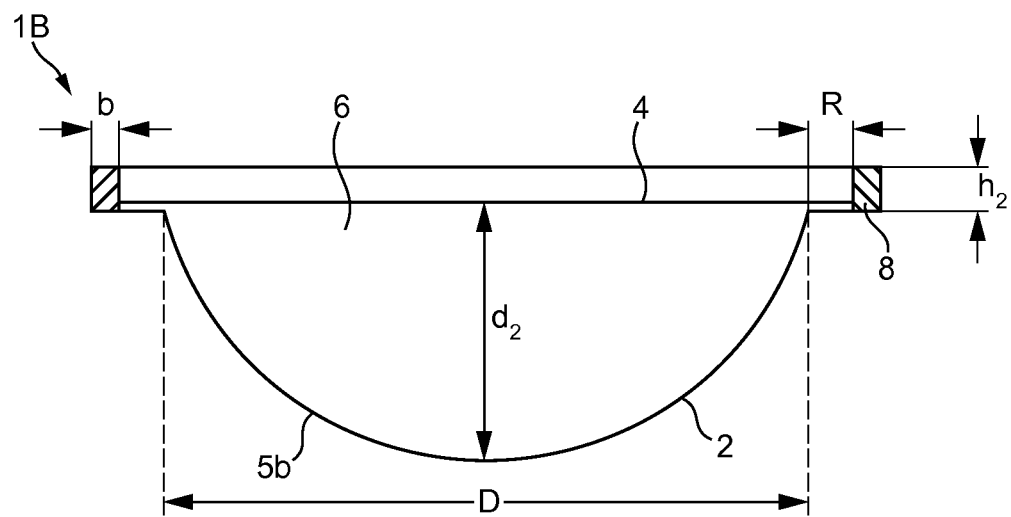
Figure 1C:
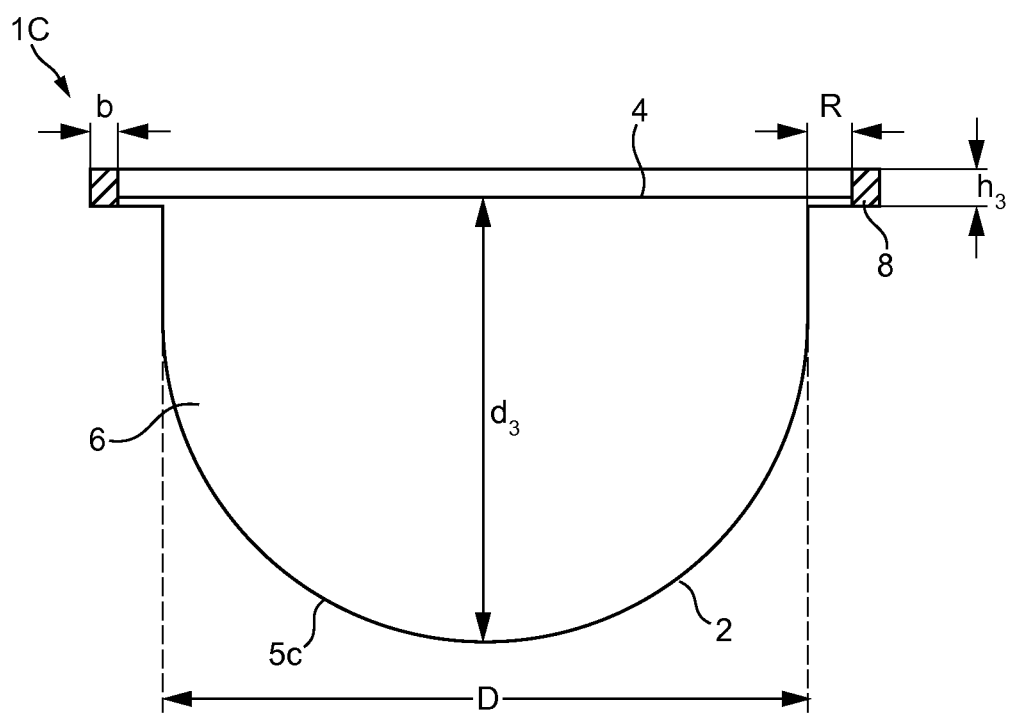

FIGS. 1a, 1b and 1c relate to a preferred embodiment of a set of receptacles, more particularly single-use capsules 1A, 1B, 1C according to invention. The capsules preferably comprise a cup-shaped body 2, a rim 3 and an upper wall member respectively a perforable membrane 4. The rim has a generally annular form. Thereby the membrane 4 and the body 2 enclose a compartment 6 of generally circular contour containing coffee powder. As shown in the figures, the membrane 4 is preferably connected onto an inner annular portion R of the rim 3 that is preferably between 1 to 5 mm. The membrane 4 is connected to the rim 3 of the body by a sealed portion (e.g., a welding joint).

Figure 2:
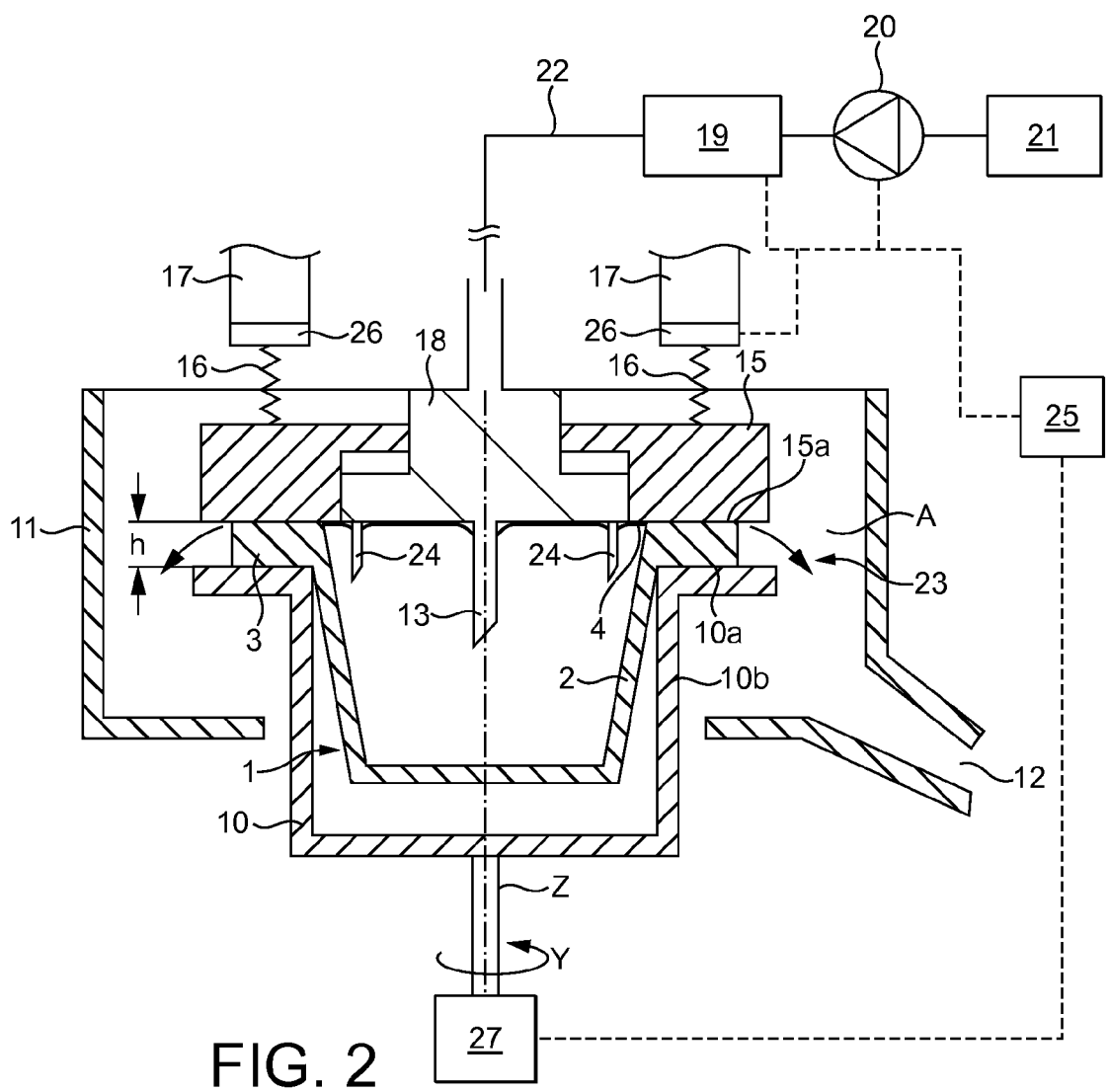
FIG. 2 is a schematic representation of the centrifugal device into which is inserted a capsule according to the invention, wherein the back-pressure is exerted by spring loading means.

The rim 3 of the capsules preferably extends outwardly in a direction essentially perpendicular (as illustrated) or slightly inclined relative to the axis of rotation Z of the capsule 1 (see FIG. 2). Thereby, the axis of rotation Z represents the axis of rotation during centrifugation of the capsule in the brewing device.

It should be understood that the shown embodiment is just an exemplary embodiment and that the capsule 1 in particular the capsule body 2 according to the invention can take various different shapes.

The body 2 of the respective capsule has a single three-dimensional convex portion 5a, 5b, 5c of variable depth, respectively, d1, d2, d3. Hence, the capsules 1A, 1B, 1C preferably comprise different volumes but a same insertion diameter 'D' for facilitating insertion in the beverage producing device. The capsule of FIG. 1a shows a small volume capsule 1A whereas the capsule of FIG. 1b show a larger volume capsule 1B or medium volume capsule and the capsule of FIG. 1c show an even larger volume capsule 1C or large volume capsule. In the present example, the insertion diameter 'D' is hereby determined at the line of intersection between the lower surface of the rim 3 and the upper portion of the body 2.

The body 2 of the capsules is preferably rigid or semi-rigid. It can be formed of a food grade plastic, e.g., polypropylene, with a gas barrier layer such as EVOH and the like or aluminium alloy, a laminate of plastic and aluminium alloy or a biodegradable material such as vegetable fibres, starch or cellulose and combinations thereof. The membrane 4 can be made of a thinner material such as a plastic film also including a barrier layer (EVOH, SiOx, etc.) or aluminium alloy or a combination of plastic and aluminium alloy. The membrane 4 is usually of a thickness between 10 and 250 microns, for example. The membrane is perforated along the rotation axis for creating the water inlet as will be described later in the description. The membrane also further comprises a perforable peripheral outlet area or portion.

Instead of the upper membrane 4, the capsules 1A, 1B, 1C may as well comprise a filter wall or rigid or semi-rigid lid member which preferably has the form of a disc of plastic comprising a central portion having an inlet port for enabling the introduction of a water injection member and a peripheral outlet portion having circumferentially arranged outlet openings. Between the central inlet port and the peripheral outlet openings, the membrane or lid is preferably formed of a liquid impermeable intermediate portion thereby ensuring that liquid cannot escape the capsule before reaching the periphery of the capsule.

The volume difference between the small and large capsules can be obtained particularly by varying the depth (d1, d2, d3) of the body 2 of the capsules in the set. In particular, the depth of the body of the smaller capsule 1A is lower than the depth of the body of the larger capsules 1B, 1C.

The difference of storage volumes (or size) of capsules enables to fill different quantities of coffee powder in the capsules as a function of the coffee beverage to be delivered. In general, the larger the capsule (i.e., the larger its depth), the higher the quantity of coffee powder it contains. Also in general, the higher the quantity, the larger the coffee extract delivered. For this, the higher the quantity of coffee powder, the larger the volume of liquid fed in the capsule. Of course, the coffee quantity could as well be varied in a capsule of same volume, but in which case, the larger capsule would preferably be chosen for all size of beverages to be delivered.

The small volume capsule 1A preferably contains an amount of coffee powder, smaller than the amount for the larger volume capsules 1B, 1C. The medium volume capsule 1B also contains an amount of coffee powder smaller than the amount of the large volume capsule 1C. In other words, the amount of powder preferably increases with the size or volume of the capsule.

Hence, the small capsule 1A becomes preferably designed for the preparation in combination with fed liquid of a short coffee and contains an amount of ground coffee comprised between 4 and 15 grams, more preferably between 5 and 8.5 grams, most preferably 7 and 8 grams.

The medium-size capsule 1B is preferably designed the preparation in combination with fed liquid of a medium-size coffee. The medium-size coffee capsule 1B preferably contain an amount of ground coffee comprised between 7 and 15 grams, more preferably between 8 and 12 grams.

The largest capsule 1C is preferably designed for the preparation in combination with fed liquid of a long-size coffee. The long-size coffee capsule 1C can contain an amount of ground coffee between 10 and 30 grams, more preferably 12 and 15 grams.

In addition, the capsules in the set may contain different blends of roast and ground coffee and/or coffees of different origins and/or having different roasting and/or grinding characteristics (i.e., measurable as the average particle size $D_{4,3}$). Coffee powder is preferably loose in the receptacle. As usual in portioned coffee area, coffee powder may be just slightly pressed before closing with the capsule with the lid.

The grind size is selected in each capsule to ensure improved extraction. In particular, the small capsule 1A is preferably filled with ground coffee having an average particle size $D_{4,3}$ within a range of 50 to 600 microns, more preferably 160 to 400 microns. It is surprising to notice that the particle size for short cups can be successfully lowered compared to traditional extraction method where 220 microns is usually the lower limit to avoid clogging of the coffee extract in the capsule. Therefore, in a mode of the method, the capsule 1A is filled with ground coffee having an average particle size $D_{4,3}$ comprised between 160 and 255 microns, most preferably 160 and 220 microns.

For a medium-size such as lungo (120 ml), it was surprisingly found that better results on sensory tasting were obtained when selecting an average grind size of coffee powder above 200 microns, in particular, between 300 and 700 microns. Of course, these results are also blend and roasting dependent but in average better results were found in these preferred selected ranges.

As indicated in FIGS. 1a to 1c, the geometry of the rim 3 may be adapted to form at least one valve portion 8, of thickness h1, h2, h3, designed for being engaged against a valve member of the beverage preparation device. For this, the rim may comprise, for example, an L-shaped cross section having an annular outer protrusion 8 formed in a direction perpendicular to a plane in which the membrane 4 is arranged. Thereby, the thickness h1, h2, h3 of the rim 3 (or valve portion 8 of said rim) is preferably adapted to the amount and/or characteristics of the beverage substance contained by the shown capsules 1A, 1B and 1C in order to enable an adjustment of the back-pressure exerted onto the capsule when being enclosed by a dedicated enclosing member 15 of a beverage production device. The rim (including its portion "R") could also be formed of a substantially constant thickness to form the valve portion 8 (FIG. 2 as example). The thickness h1, h2, h3 of the rim is determined as the thickness of the rim in axial direction (i.e., a direction parallel to axis I of the capsule) at its thicker region. By determining the back-pressure and by setting the rotational speed in the device during the coffee extraction, it is possible to control the liquid flow rate and consequently influence the quality attributes of the coffee beverage.

In particular, for capsules containing a small amount of coffee powder—e.g. capsule 1A—in order to prepare e.g. a ristretto or espresso coffee beverage, a slower extraction might be desired for providing the coffee with a higher intensity (i.e., a larger amount of total coffee solids transferred in the coffee extract). These characteristics can be compared to a faster extraction which might be desired for the beverage coming out of capsules 1B or 1C containing a larger amount of coffee powder. The extraction is here defined as "slower" by controlling a slower liquid flow rate during coffee extraction. Such slower liquid flow rate can be controlled by rotating the capsule at a lower speed and/or providing a higher back-pressure through the restriction of the liquid extract leaving the capsule. In other words, the smaller the amount of coffee powder in the capsule, preferably the slower the liquid flow rate. Similarly, considering the smaller capsule contains a smaller amount of coffee; the smaller the capsule, preferably the slower the liquid flow rate. Similarly, considering that the higher thickness of the rim is preferably designed for delivering the shorter coffee beverage; the higher the thickness, the slower the liquid flow rate.

For example, for smaller-size capsules as indicated by FIG. 1a, the thickness h1 is preferably chosen to be between 1.5 and 3.5 mm; preferably between 2.0 and 3 mm, most preferably between 2.0 and 2.8 mm. For bigger-size capsules as indicated by FIGS. 1b and 1c, thickness h2 respectively h3 is preferably chosen to be between respectively 0.8 and 2.5 mm, preferably between 0.8 and 2.0 mm and most preferably between 1.0 and 1.5. Of course such values can differ greatly depending on the configuration of the valve means, in particular, on the device side.

It is to be understood that the thickness (h1, h2, h3) of the rim 3 respectively the annular protrusion 8 of a specific capsule may not only be adapted with regard to the capsule volume (i.e., storage volume), but also with regard to the nature of the beverage substance (e.g., amount, density, composition, etc.) contained within the capsule such that the back-pressure resulting when the rim 3 of the capsule is engaged with a portion of valve of the dedicated device, is adjusted to a desired value. The thickness is the effective distance which is adapted to adjust the back-pressure during the beverage extraction process by insertion of the capsule in the device.

FIG. 2 shows a sectional side view of a beverage producing device according to the system of the invention in a closed state thereof. Thereby, the device comprises a rotating driving means including a rotating capsule holder 10, a rotary motor 27, connected to the capsule holder 10 by an axle of rotational axis Z. The device also comprises a collector 11 onto which the centrifuged liquid impacts and is drained through a beverage outlet 12.

Furthermore, the device comprises liquid feeding means 18 having a liquid injector 13 being arranged to pierce the membrane 4 of the capsule 1 in a central portion thereof and feed liquid (preferably hot water) in the capsule. The injection means 18 preferably also comprise a series of outlet perforators 24 as described in WO2008/148604. Accordingly, outlets are produced in an annular portion of the membrane 4 to enable to an extracted beverage to leave the capsule 1 during the rotational movement thereof. The liquid feeding means 18 are connected to liquid circuit 22 comprising a liquid supply 21, a pump 20 and heater 19 for providing a predefined volume of heated pressurized liquid to the capsule 1 during the beverage preparation process.

The device further comprises a valve portion 15 which is arranged circumferentially to the liquid feeding means 18 and which has a lower annular pressing surface 15a.

The valve portion 15 and the injection unit 18 are preferably movable with respect to the capsule holder 10 in order to enable insertion and ejection of the capsule 1 to and from the capsule holder 10 before respectively after the beverage extraction process. Moreover, the liquid feeding means 18, the valve portion 15 and the capsule holder 10 are rotatable about axis Z. The valve portion 15 is also made moveable independently from the liquid feeding means 18 to take into account the different possible thicknesses of the capsules without affecting the relative position of the injection portion when engaged against the capsule. For this, portion 15 can be slidably mounted about liquid feeding means 18.

The capsule 1 also lies solidly on its rim 3 onto an upper flange 10a of the capsule holder 10 without the body 2 substantially deforming radially. In this configuration, the liquid feeding means 18 and the valve portion 15 are engaged against the membrane 4 and rim, respectively. The system thereby forms a restriction valve 23 by engagement of the valve portion 15 of the device and valve portion 8 of the capsule. In open configuration of the valve 23, a flow restriction is created that enables to force the flow of centrifuged liquid into at least one narrow jet of liquid projected onto the impact surface 11 of the device. The restriction forms an annular opening of surface area preferably comprised between 1.0 and 50 mm², preferably between 1.0 and 10.0 mm². The surface area of the flow restriction can vary depending on the set backpressure value in the valve by the capsule, the shape of the valve portion, in particular, the thickness h1, h2 or h3, and the rotational speed of the capsule wherein in general the higher the speed, the larger the surface area. The flow restriction can be formed as a continuous circumferential slit or a plurality of discrete circumferential restriction openings.

The restriction valve 23 is designed to close or at least restrict the flow passage under the force of a resilient closure load obtained by a load generating system 16, 17 comprising preferably spring-biasing elements 16. The spring-biasing elements 16 apply a predefined resilient load onto the valve portion 15. The load primarily distributes itself along the pressing surface 15a of the valve portion 15 acting in closure against the annular surface of the valve portion of rim 3. Such surface may also be a simple annular contact line. Therefore, the valve 23 normally closes off the flow path for the centrifuged liquid until a sufficient pressure is exerted on the upstream area of the valve by the centrifuged liquid exiting through the orifices created by the perforating elements 24. It should be noted that a small leakage for liquid or gas through the valve means 23 may be required that helps vent the gas or air contained in the capsule during the prewetting of the capsule with liquid (not shown). Preferably, the gas leakage is controlled to be sufficiently small to be tight to liquid or at least reduce liquid flow to a small leak, at least until a certain pressure is reached at the periphery of the capsule. Of course the spring biaising elements 16 can take various configurations. For example, the elements 16 and portion 15 can be constituted as a single resilient piece.

During extraction, the liquid flows thus between the membrane 4 and the valve portion 15 and forces the valve 23 to open by pushing the whole enclosing member 15 upwards against the force of the spring-biasing element 16. The centrifuged liquid can thus traverse the restriction created between the surface 15a of the portion 15 and the upper surface or line of the rim 3 or protruding portion 18. The liquid is thus ejected at a high velocity against the collector 11 as indicated by arrow A in FIG. 2 or another vertically oriented annular wall of the device placed between the collector and the valve 23 (not shown).

It has been found that the "crema" can be significantly improved in the cup by controlling the shortest distance, herein called "flying distance", between the outermost centrifuged surface of contact (e.g., flow restriction or another surface) and the impact wall (e.g., the cylindrical vertical wall in FIG. 2) of the collector 11. In particular, the distance is found to be shorter for providing a larger amount of crema. It was found that a preferred flying distance is within a range of 0.3 to 10 mm, more preferably 0.3 to 3 mm, most preferable between 0.5 and 1 mm. Furthermore, it was also found that the flying distance should increase when the volume of the coffee extract to be delivered increases in order to adjust the amount of crema accordingly. Surprisingly, the largest crema was always obtained for flying distances below 1 mm. Of course, the formation of crema also depends on other possible parameters such as the back-pressure of the valve which can be adjusted accordingly as explained later on (Typically, the higher the back-pressure the larger the crema).

Thereby, extraction of the beverage out of the capsule 1 is obtained by driving the liquid feeding means 18, the valve portion 15 and the capsule holder 10 together with the capsule, in rotation (Y) about axis Z while feeding liquid in the capsule. The rotation is driven by rotational motor 27 connected to at least the capsule holder 10 or the injection unit 18. Hence, during operation of the capsule 1 placed into the system according to the invention, the capsule 1 is rotated about its axis Z. Thereby, liquid which is centrally injected into the capsule 1 would tend to traverse the coffee powder and be guided along the inner surface of the side wall of the body 2, up to the inner side of the membrane 4, and then through the perforated outlet openings created in the membrane 4 by the perforating members 24. Due to the centrifugation force given to the liquid in the capsule 1, the liquid and coffee powder are made to interact in order to form a liquid comestible (e.g., liquid extract) before leaving through the valve 23.

It is to be understood that the force acting on the rim 3 of the capsule 1 by the pressing surface 15a can be adjusted by the geometry of the rim 3 such as e.g. the thickness h of the rim 3 (or thickness h1, h2 and h3 of the outer protrusion 8 in FIGS. 1a-1c). Hence, in particular the exerted back-pressure acting on the rim 3 can be adjusted by adapting the thickness h of the rim 3 to predefined values thereof. Thereby, a higher back-pressure can be obtained by a larger thickness "h", since this leads to a higher compression of the spring biasing element 16 which then exerts a higher force onto the pressing surface 15a. Correspondingly, a lower value of thickness "h" leads to a lower compression of the spring biasing element 16 and thus, to a relative lower force acting on the pressing surface 15a, so a lower back-pressure. Hence, the thickness h is preferably designed to increase for obtaining a resulting higher back-pressure. As illustrated in FIG. 2, a sensing means 26 can be connected to a control unit 25 of the device in order to provide information related to the present back-pressure acting onto the rim 3 of the engaged capsule, i.e., pressure or force value.

The control unit 25 is preferably connected to at least the rotary motor 27, the liquid pump 20, the heater 19 and sensors. Thus, the brewing parameters such as the rotational speed of the motor 27, the temperature, the pressure and/or the volume of the liquid provided to the capsule during the beverage production process may be adjusted dependent on a pre-programmed preparation cycle and using eventually information of the sensing means 26 or other sensors in the device. For example, in function of the sensed information by the pressure sensors 26 and/or the flowmeter, the rotational speed can be adjusted at the desired value that corresponds to a desired liquid flow rate. Selection of the speed is provided in the control unit 25 which controls in return the rotary motor 26 and if necessary the liquid flow rate of the pump 20 to ensure sufficient supply of liquid in the capsule as a function of the selected speed. Regulation of the pump might also be useful to limit the inlet pressure (pressure of the water injected in the capsule); such pressure limit being given by the sealing engagement of the capsule with the machine, e.g., by a sealing gasket around the injector 13.

Figure 3:
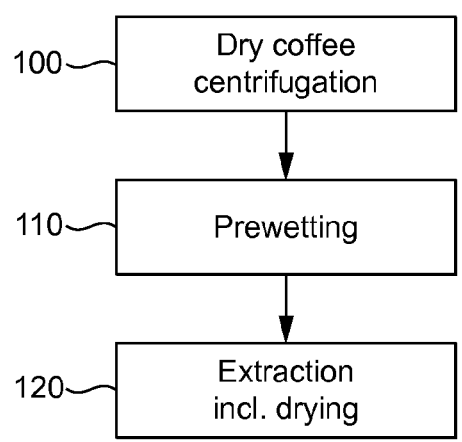
FIG. 3 shows a preferred processing chart for controlling the preparation of the coffee beverage in the device of FIG. 2.

FIG. 3 illustrates a possible cycle for operating the device of the invention and preparing a coffee beverage from any of the capsules of FIGS. 1a-1c.

A capsule 1a, 1b or 1c is first inserted in the device as previously described. The user usually activates a switch on a key board (not shown) for starting the preparation process or the process can start automatically after insertion of the capsule in the device. In the "dry coffee centrifugation" step 100, the control unit 25 commands the rotational driving means (motor 27 in FIG. 2) to start an optimal centrifugation of the dry coffee powder. In this step, the liquid pump 20 is not activated yet. The speed of rotation is preferably relatively high and its duration short to ensure a rapid but effective compaction of the coffee against the periphery of the capsule, mainly against the sidewall and peripheral region of the upper wall. Preferably, the rotation speed is of about 4000 to 8000 rpm, most preferably between about 4000 and 7500 rpm, and maintained during about 0.5 second to 6 seconds. In addition, the rotation speed is preferably accelerated during this step. Coffee powder thereby migrates towards the internal periphery of the receptacle where it compacts leaving a passage in the centre. The coffee is thus given the form a compressed coffee toroid-shaped mass. This dry centrifugation step can reduce the problem of clogging of the injector with powder. This step is therefore optional and can be omitted if the injector is designed in such a manner that its clogging is unlikely to occur.

In the second step or "prewetting" step 110, the rotation of the capsule is stopped or at least two or more times reduced, i.e., by stopping the motor 27 and liquid is fed through the injector 13 in the capsule in the centre of the capsule. Liquid can be injected in the capsule preferably in an amount substantially proportional to the amount of coffee powder contained in the capsule. The liquid flow rate of injected liquid during prewetting is preferably comprised between 1 and 10 ml/second, more preferably 4 and 6 ml/second.

Importantly, the left free volume of the capsule is completely filled with liquid in the prewetting step. Therefore, the quantity of liquid filled in the capsule may vary from capsule to capsule depending on its size (small, medium or large) and depending on the powder quantity or filling level of the capsule. Since the capsule acts as a centrifugal pump during extraction, in order for it to act as an efficient pump, it has to be full of liquid (i.e., hot water with as less air as possible). This allows having a larger reliability in terms of repeatability of liquid flow rates, rotational speeds, etc.

During prewetting, the liquid flow rate and quantity of liquid are controlled by a flow meter (not shown) that provides flow information to the control unit for calculation and control of the liquid supply pump.

In the third step or extraction step 120, the capsule is centrifuged again by the control unit activating the rotational motor 27. Liquid continues to be injected by the pump. The rotational speed is controlled by the control unit according to the quantity of coffee powder in the capsule and/or the type of capsule in the device. The rotational speed can further be controlled to maintain the liquid flow rate of reference during extraction as described in WO 2009/106598. In general, the liquid flow rate is typically measured by a flow meter located in the device between the heater and the extraction head.

It should be noted that the dry centrifugation step 100 and the prewetting step 110 can be carried simultaneously in a same step.

It has been found that the rotational speed range during this extraction step is preferably comprised between 500 and 8000 rpm, preferably 2500 and 7500 rpm. The rotational speed is selected in a preferred range depending on the volume of delivered beverage. For all delivered volumes of the liquid coffee extract, it has been found advantageous to select the speed range between 500 and 8000 rpm, more preferably 2500 and 7500 rpm and most preferably between 3000 and 4500 rpm. It has been surprisingly found that the aroma and flavour is more intense than if the centrifugation is speedier. However, the sensory difference becomes also less noticeable as the volume of coffee extract increases, especially for the larger coffee extracts (230 ml). The flavour and aroma intensity of coffee can be further improved by selecting the proper amount of coffee in the capsule, the proper liquid flow rate, and the proper grind size as aforementioned.

During extraction step 120, the liquid is fed until the total volume of fed liquid reaches at least the preset volume corresponding to the desired coffee beverage volume. Possibly, a larger volume of liquid is fed in the capsule than the desired coffee beverage volume as some liquid may remain in the capsule after extraction. Coffee extract is passed through the valve 23, collected by collector 11 and dispensed via duct 12 in a cup. Different preset volumes can be stored in the control unit, such as 25 ml for ristretto, 40 ml for espresso, 120 ml for lungo and 230 ml for large coffee. The control unit receives flow information from the flow meter enabling the control of the beverage volume, as known in the art, and stops the liquid pump 20 when the preset volume is reached. Once the pump is stopped, the rotation of the capsule is continued for emptying the capsule from coffee liquid. Therefore, the motor continues to drive the capsule in rotation at relatively high speed, preferably, within the same speed range as during the first part of the extraction step 120. It has been found that the drying operation does not really impact on the coffee results (Tc or total solids, sensory). Therefore, such operation is essentially carried out to remove liquid from the capsule.

In another possible mode of the invention (not illustrated), the backpressure can be obtained by a fixed restriction such as by at least one, but preferably a plurality of radially positioned outlet orifices provided through the capsule. The total opening surface area can vary in function of the type of capsule in the set. The restriction orifices provide a backpressure which is function of the number of outlet orifices and the individual opening section of each orifice.

EXAMPLES

Figure 4:
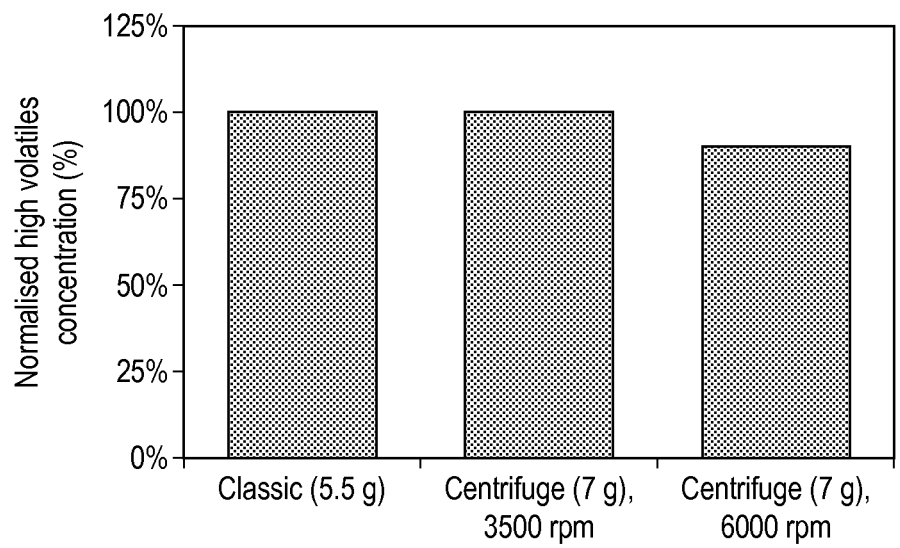
FIG. 4 shows a comparative graph illustrating the concentration on aroma high volatiles in coffee extracts (in %) for a traditional pressure brewing method and for the centrifugation method of the invention at different rotational speeds.

1. Above-Cup-Aroma:

1.1. Impact of Rotational Speed on Aroma Volatile Compounds Concentration:

Comparison is provided in FIG. 4 between a short coffee extract (25 ml) obtained by a traditional brewing system and a system of the invention using centrifugation.

In the traditional brewing system, a commercial Nespresso® Arpeggio branded capsule is utilized. The capsule is extracted according to the process described in EP 0512 470 in a Nespresso® Concept® machine. The coffee weight (amount of R&G coffee in the capsule was 5.5 grams).

In the centrifugation brewing system of the invention, the liquid flow rate was maintained constant during the extraction step at about 1.4 ml/sec. Two different rotational speeds were tested, i.e., 3500 and 6000 rpm. The coffee weight was of 7 grams placed in a small volume capsule. The opening pressure of the restriction valve was of 3.33 Kg.force/cm².

The results shown that at 3500 rpm, about 12% more ACA (Concentration in high and medium volatiles) than at 6000 rpm is obtained. Furthermore at 3500 rpm, about the same concentration of volatiles is obtained than for the traditional extraction method. The rotational speed did not influence significantly the amount of low volatile compounds in the extract (results not shown).

The analysis for determining the ACA volatiles is called IDA (isotope dilution assay) and generally consists in:

Extracting coffee, sampling and eventually diluting depending on the sample and analytes,
cooling at room temperature,
adding of internal standards (deuterium or 13C-labelled)
stirring and equilibrating (10 minutes in general),
transferring of 7 ml to 20 ml headspace vials and,
sampling of volatiles compounds with headspace solid phase micro-extraction (HS-SPME), separation of compounds by gas chromatography and quantification by mass spectrometry (GC-MS). About eleven aroma volatile compounds representing high, medium and low volatiles coffee aroma fractions were quantified (i.e. pyrazines, sulfur compounds, diketones and phenols).

Figure 5:
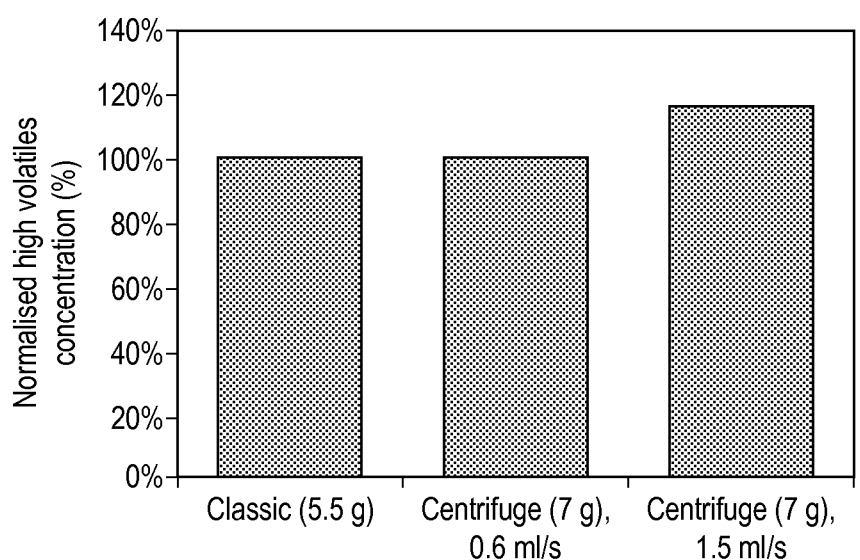
FIG. 5 shows a comparative graph illustrating the concentration on aroma high volatiles in coffee extracts (in %) for a traditional pressure brewing method and for the centrifugation method of the invention at different liquid flow rates.

1.2. Impact of Liquid Flow Rate on Aroma Volatile Compounds Concentration:

The impact of the liquid flow during extraction rate on ACA was measured on volatiles concentration for a small coffee extract (25 ml). These results are shown in the graphic of FIG. 5.

The weight of coffee in the capsules was maintained at 7 grams for the centrifuged capsules and 5.5 grams for the Nespresso capsule using the traditional extraction process.

At 1.5 ml/s., a significantly higher concentration of volatiles is obtained than at 0.6 ml/s., more specifically, 16% more high volatiles, 11% more medium volatiles and 8% more low volatiles.

Figure 6:
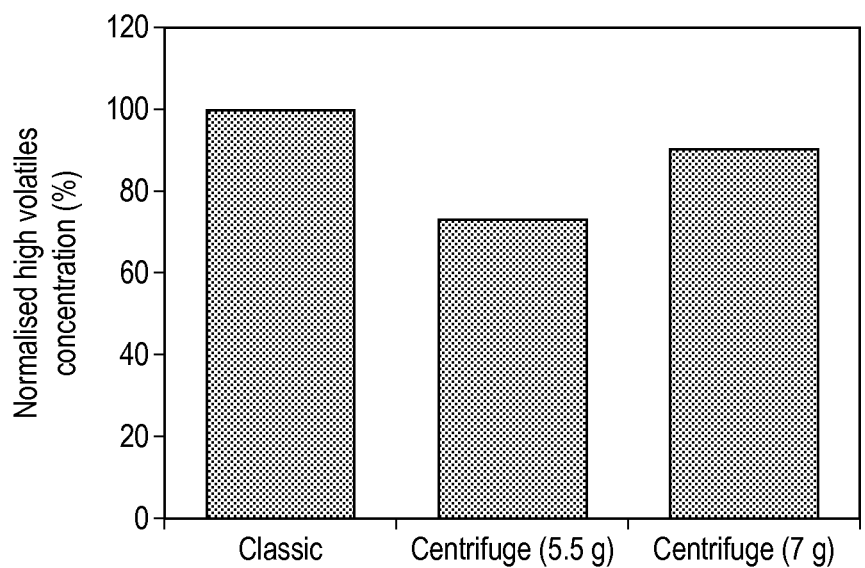
FIG. 6 shows a comparative graph illustrating the concentration on aroma high volatiles in coffee extracts (in %) for a traditional pressure brewing method and for the centrifugation method of the invention at different coffee weights in the capsule.

1.3. Impact of Coffee Weight on Volatiles:

The impact of the amount of coffee in a small capsule for delivering 25 ml of coffee extract was measured on volatiles concentration. A capsule filled with 5.5 grams was compared with a capsule filled with 7 grams of coffee powder in the centrifugation method. The liquid flow rate during extraction was maintained at 1.4 ml/sec and the extraction was carried out at 6000 rpm. The results are shown in FIG. 6.

The higher the coffee weight is, the higher the ACA content is. Furthermore, 18% more volatiles and 7% more medium volatiles were measured for 7 grams of coffee than for 5.5 grams.

Figure 7:
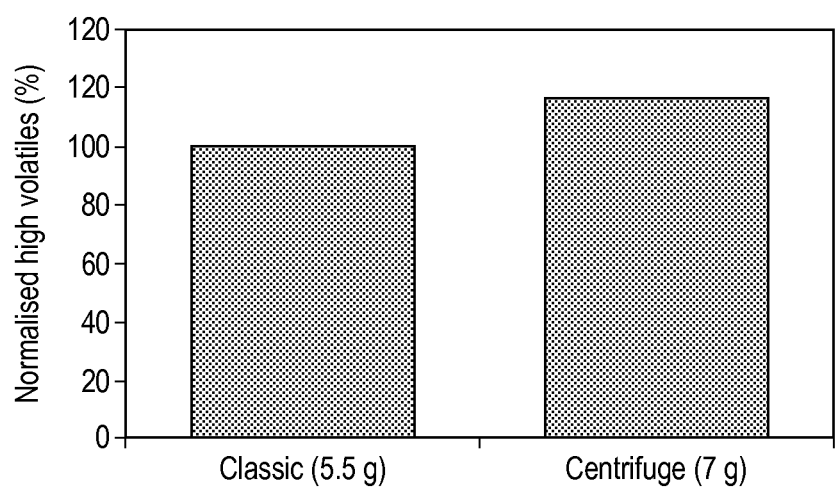
FIG. 7 shows a graph illustrating the concentration on aroma high volatiles in coffee extracts (in %) for a traditional pressure brewing method compared to an optimized centrifugation method of the invention.

1.4. Optimal Extraction Condition for Volatiles:

The highest ACA was obtained at 1.5 ml/s., liquid flow rate during extraction and a rotational speed between 3500 and 4500 rpm and 7 grams of coffee. Under these conditions, the ACA levels were higher than for an extraction carried out for a traditional capsule. The results are graphically shown in FIG. 7.

2. Sensory Profile:

2.1. Ristretto Cup (25 ml):

The sensory profile of the coffee extract as obtained by the method of the invention was compared at different centrifugal speeds but maintaining the liquid flow rate constant during coffee extraction. The coffee extract delivered was a short coffee of 25 ml. For the liquid, mineral water commercialized under the trade name Parma® was used. The capsules were filled with 5.5 grams of coffee powder obtained from Nespresso® blend known under the trade name Arpeggio.

Two coffee extracts were compared. One coffee extract was obtained at 3000 rpm (low speed) and the other at 6000 rpm (high speed). These coffee extracts were tasted and evaluated by a trained sensory panel composed by 12 panellists.

On aroma, the low speed extracts have a higher overall intensity with higher roasty aroma. On flavour, the low speed extracts have a higher overall intensity with higher roasty flavour and less bitterness. On texture and aftertaste, the low speed extracts experiences more body and more persistency.

2.2. Espresso Cup (40 ml):

The sensory profile was also obtained for a coffee extract of 40 ml. The capsules were filled with 5.8 grams of coffee powder. The liquid flow rate was controlled during extraction at about 1.4 ml/sec. The back-pressure at the restriction valve was measured of about 3.3 kg force/cm².

The coffee extracts were compared at 3500-4500 rpm (lower speed) and 6000-7000 rpm (higher speed).

The aroma and flavour intensities for the higher speed were clearly lower, in particular in the range of roasty notes. The texture was also lighter.

2.3. Lungo Cup (120 ml):

The sensory profile was also tested for a lungo coffee extract. The capsules were filled with 6.4 grams of coffee powder. The liquid flow rate was controlled during coffee extraction at about 3.5 ml/sec. The back-pressure at the restriction valve was measured of about 3.3 kg force/cm².

The coffee extracts were compared at 4000-5000 rpm (lower speed) and 6000-7000 rpm (higher speed).

Again, the aroma intensity and flavour intensity for the higher speed were lower, in particular in the range of roasty notes. The texture was also lighter. However the differences were less noticeably than for smaller coffee extracts (25 or 40 ml).

2.4. Large Cup (230 ml):

The sensory profile was also tested for a large coffee extract. The capsules were filled with 12 grams of coffee powder. The liquid flow rate was controlled during coffee extraction at about 3.5 ml/sec. The back-force at the restriction valve was measured of about 3.3 kg force/cm$^2$.

The coffee extracts were compared at 5000-6000 rpm (lower speed) and 8000-9000 rpm (higher speed).

The differences were hardly noticeable but the lower speed revealed a higher score roasty note.

3. Impact of Granulometry on Yield.

The impact of granulometry (average particle size) was studied on a short coffee extract (25 ml) using capsules containing 6 grams of coffee powder (Arpegio blend).

The rotational speed was in the range of 4000-6000 rpm.

The results on coffee yield are reported in the table below:

| Average grind size ($D_{4,3}$) | Coffee yield (%) |
| --- | --- |
| 60 | 12.5 |
| 75 | 12 |
| 100 | 12 |
| 160 | 27.5 |
| 174 | 27 |
| 211 | 26.5 |
| 227 | 28.5 |
| 266 | 26.5 |

The average particle size distribution ($D_{4,3}$) and fines level (F<91.2 microns) were determined by laser diffraction using a "Mastersizer S" instrument from Malvern® equipped with a 1000 mm optical lens. 1-2 g of powder are dispersed in 1 liter of butanol and recirculated in front of the laser beam in order to obtain an obscuration between 15 and 20%. The particle size distribution is obtained by Fraunhofer approximation of the diffraction pattern. The complete experiment is repeated 3 times (or until the Standard Deviation<5%) and the results are averaged.

The "extraction yield" is defined as the weight of total solids in the liquid extract divided by the total weight of dry coffee powder in the cartridge. This value is typically expressed as a percentage.

Although the present invention has been described with reference to preferred embodiments thereof, many modifications and alternations may be made by a person having ordinary skill in the art without departing from the scope of this invention which is defined by the appended claims.

What is claimed is:

1. A method for preparing a short coffee extract of about 25 (+/−3) ml from a capsule containing coffee powder, the method comprising:
   providing a capsule having a body and a rim, the capsule having a storage volume available for receiving the ground coffee powder and gas comprised between 18 and 28 ml, and containing between 7 and 8 grams of ground coffee powder;
   injecting a liquid into the capsule to interact with the coffee powder and form a coffee extract; and
   rotating the capsule in a beverage producing device at a speed of 3500 to 4500 rpm to generate centrifugal forces that urge the water through the coffee powder to form a liquid coffee extract and to expel the extract out of the capsule, wherein the rotating of the capsule generates a flow rate for the liquid coffee extract of between 1.4 and 2.0 ml/second during extraction of the liquid coffee extract from the capsule.

2. The method according to claim 1, wherein the capsule contains coffee powder having an average particle size (D4,3) of 160 to 400 microns.

3. The method according to claim 2, which further comprises prewetting the coffee powder with hot water prior to rotating the capsule to enable the water to mix with the coffee powder while the capsule is not rotated or while the capsule is rotated at a speed lower than 1000 rpm.

4. The method according to claim 1, which further comprises passing the liquid coffee extract through a flow restriction to provide a centrifuged jet of liquid coffee extract; and directing the jet of liquid coffee extract on an impact wall to assist in the collection and delivery of the liquid coffee extract.

5. The method according to claim 4, wherein the flow restriction comprises a restriction valve which opens or increases an opening surface area under pressure from the centrifuged liquid coffee extract, with the valve having a back pressure determined by a thickness of the capsule rim which is engaged against a valve portion of the beverage producing device, wherein, in absence of centrifuged liquid coffee extract acting thereon, the restriction valve is pressed in closure or in a minimal flow surface area under a back-pressure of 1 to 20 Kg force/cm$^2$.

6. The method according to claim 3 comprising controlling the device such that the amount of the hot water fed into the capsule in the prewetting increases proportionally to the quantity of powder in the capsule.

7. A method for preparing a short coffee extract of about 24 (+/−1) ml from a capsule containing coffee powder, the method comprising:
   providing a capsule having a body and a rim, the capsule having a storage volume available for receiving the ground coffee powder and gas of about 24 (+/−1) ml, and containing between 7 and 8 grams of ground coffee powder;
   injecting a liquid into the capsule to interact with the coffee powder and form a coffee extract; and
   rotating the capsule in a beverage producing device at a speed of 3500 to 4500 rpm to generate centrifugal forces that urge the water through the coffee powder to form a liquid coffee extract and to expel the extract out of the capsule, wherein the rotating of the capsule generates a flow rate for the liquid coffee extract of between 1.4 and 2.0 ml/second during extraction of the liquid coffee extract from the capsule.

* * * * *